(12) United States Patent
Robbins et al.

(10) Patent No.: US 6,265,678 B1
(45) Date of Patent: Jul. 24, 2001

(54) CIRCUIT BREAKER MOVEMENT SYSTEM WITH OVER-TRAVEL PROTECTION

(75) Inventors: W. Dale Robbins, Lithonia; James H. Blessitt, Peachtree City, both of GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/434,436

(22) Filed: Nov. 5, 1999

(51) Int. Cl.[7] .................................................. H01H 9/00
(52) U.S. Cl. ........................................ 200/50.21; 361/608
(58) Field of Search ............................... 200/17 R, 50.01, 200/50.21–50.26, 500, 501; 361/600, 615, 605–610

(56) References Cited

U.S. PATENT DOCUMENTS

| | | | |
|---|---|---|---|
| 4,914,549 | * | 4/1990 | Leone et al. ........................ 361/336 |
| 5,278,722 | * | 1/1994 | Peruso ................................ 361/606 |
| 5,337,210 | * | 8/1994 | Ishikawa et al. .................... 361/608 |
| 5,837,949 | | 11/1998 | Green et al. ...................... 200/50.21 |
| 5,912,444 | * | 6/1999 | Godesa .............................. 200/50.01 |
| 6,028,272 | * | 2/2000 | Akers ................................ 200/50.26 |
| 6,031,192 | * | 2/2000 | Liebetruth ........................ 200/50.21 |

* cited by examiner

Primary Examiner—Michael Friedhofer (57) ABSTRACT

A mechanism is provided for moving a circuit breaker (12) with respect to a circuit breaker connecting apparatus (14) so as to connect or disconnect the circuit breaker from the circuit breaker connecting apparatus. The mechanism includes a draw bracket assembly (29) having a draw bracket (30) constructed and arranged to be mounted to the circuit breaker connecting apparatus (14) so as to be generally adjacent to a side of the circuit breaker connecting apparatus. A guide engaging member (36) is mounted for generally vertical movement with respect to the draw bracket (30). The guide engaging member (30) has a slot structure (42) therein having surfaces constructed and arranged to receive and engage a guide (26) associated with the circuit breaker (12) for moving the circuit breaker with respect to the circuit breaker connecting apparatus (14). A drive member (55) is provided and has a movable element (56). The drive member (55) is constructed and arranged to be actuated so as to cause movement of the movable element (56). A motion transmitting structure (54) is operatively associated with the movable member (56) and the guide engaging member (30) such that movement of the movable element (56) causes the motion transmitting structure (54) to move thereby causing the guide engaging member (30) to move between an operational range of motion to engage or disengage the circuit breaker (12) from the circuit breaker connecting apparatus (14). The movable element (56) is constructed and arranged to disengage from the drive member (55) or disengage from the motion transmitting structure (54) outside of the operational range of motion.

24 Claims, 5 Drawing Sheets

CIRCUIT BREAKER MOVEMENT SYSTEM WITH OVER-TRAVEL PROTECTION

BACKGROUND OF THE INVENTION

The present invention relates to a circuit breaker draw-withdraw apparatus for use with a circuit breaker to move the circuit breaker so as to be connected to or be disconnected from a plug-in base.

Conventionally, a plug-in base for a circuit breaker is mounted on a panel board or other base structure and is wired to circuitry on the base structure. A circuit breaker is installed in the plug-in base by inserting stabs protruding from the circuit breaker into jaws fixed to the plug-in base. The jaw/stab connection provides the primary electrical connection between the circuit breaker and the plug-in base. This connection may also mechanically retain the circuit breaker in the plug-in base.

Withdraw mechanisms have been developed for mechanically drawing a circuit breaker unit into a plug-in base and withdrawing the circuit breaker unit from the plug-in base. An example of such a withdraw mechanism is disclosed in U.S. Pat. No. 5,837,949 to Green et al. The withdraw mechanism described in Green et al. is operated by rotating a screw linkage using a drive tool inserted into the front of the withdraw mechanism which draws the circuit breaker into or withdraws the circuit breaker from the plug-in base. This type of mechanism is advantageous since a high amperage circuit breaker is heavy and thus difficult for a technician to position properly in the plug-in base by hand. In addition, the jaws in a high amp plug-in base may require a high insertion force, making it difficult or impossible for a technician to apply sufficient force to fully insert the stabs into the jaws.

A circuit breaker withdraw mechanism typically includes a component attached to the plug-in base and a component attached to the circuit breaker. Installation of the withdraw mechanism may take place in the field, in a supplier warehouse or at the circuit breaker production plant.

It is desirable to ensure that the screw linkage of the withdraw mechanism ceases operation after the drive tool rotates the screw linkage past its operational range of motion, both in the withdraw and install directions. In lower amperage applications, this may be accomplished by providing stops at either end of the screw linkage travel, preventing rotation of the screw linkage past the operational range of motion. However, in high-amperage applications stops are not adequate since greater torque must be applied to the drive tool and the mechanism may be damaged by over-travel. Accordingly, there is a need to provide improved over-travel protection in a withdraw mechanism.

SUMMARY OF THE INVENTION

An object of the invention is to fulfill the need referred to above. In accordance with the principles of the present invention, this objective is achieved by providing a mechanism for moving a circuit breaker with respect to a circuit breaker connecting apparatus so as to connect or disconnect the circuit breaker from the circuit breaker connecting apparatus. The mechanism comprises a draw bracket assembly including a draw bracket constructed and arranged to be mounted to the circuit breaker connecting apparatus so as to be generally adjacent to a side of the circuit breaker connecting apparatus. A guide engaging member is mounted for generally vertical movement with respect to the draw bracket. The guide engaging member has a slot structure therein having surfaces constructed and arranged to receive and engage a guide associated with the circuit breaker for moving the circuit breaker with respect to the circuit breaker connecting apparatus. A drive member is provided and has a movable element. The drive member is constructed and arranged to be actuated so as to cause movement of the movable element. A motion transmitting structure is operatively associated with the movable member and the guide engaging member such that movement of the movable element causes the motion transmitting structure to move thereby causing the guide engaging member to move between an operational range of motion to engage or disengage the circuit breaker from the circuit breaker connecting apparatus. The movable element is constructed and arranged to disengage from the drive member or disengage from the motion transmitting structure outside of the operational range of motion.

In accordance with another aspect of the invention, a method of preventing over-travel of a circuit breaker movement structure is provided. The movement structure includes a circuit breaker assembly having a guide, a circuit breaker connecting apparatus having a draw bracket with a guide engaging member being mounted for generally vertical movement with respect to the draw bracket, the guide engaging member having a slot structure therein, a drive member having a movable element, the drive member being constructed and arranged to be actuated so as to cause movement of the movable element, and a motion transmitting structure operatively associated with the movable member and the guide engaging member. The method includes actuating the drive member to move the movable element causing the motion transmitting structure to move thereby causing the guide engaging member to move between an operational range of motion to engage or disengage the circuit breaker from the circuit breaker connecting apparatus by use of the guide. The movable element is caused to disengage from the drive member or from the motion transmitting structure outside of the operational range of motion.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

Preferred embodiments of the invention are described in greater detail herein below with reference to the drawings wherein.

DETAILED DESCRIPTION OF THE PREFERRED EMBODIMENTS

Figure 1:
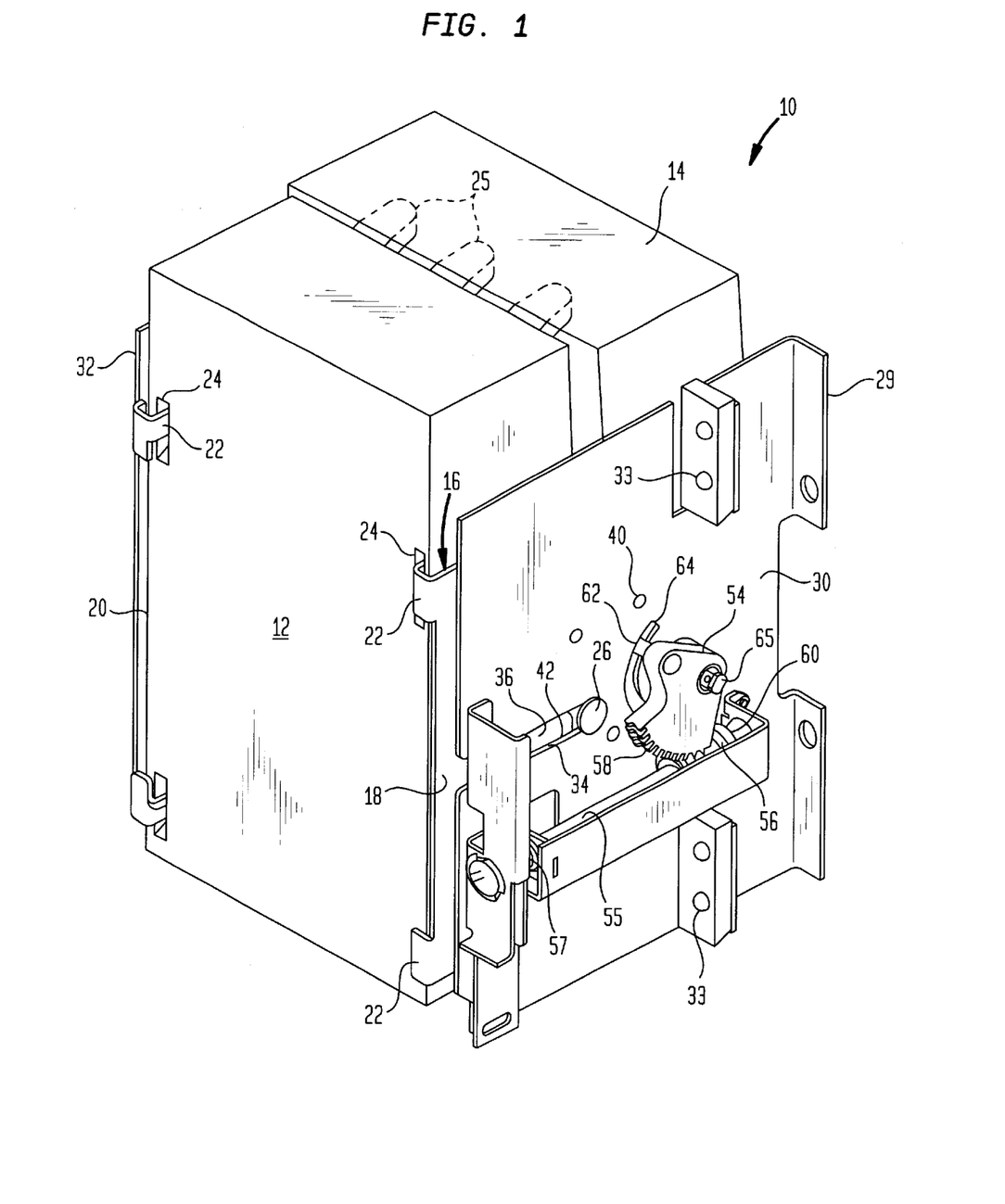
FIG. 1 is a right side perspective view of a circuit breaker movement system provided in accordance with the principles of the present invention.

With reference to FIG. 1, a circuit breaker movement system, generally indicated at 10, is provided in accordance with the principles of the present invention. The circuit breaker movement system 10 is used with a circuit breaker 12 to move the circuit breaker 12 so as to be connected with or be disconnected from a circuit breaker connecting apparatus or plug-in base 14.

Figure 2:
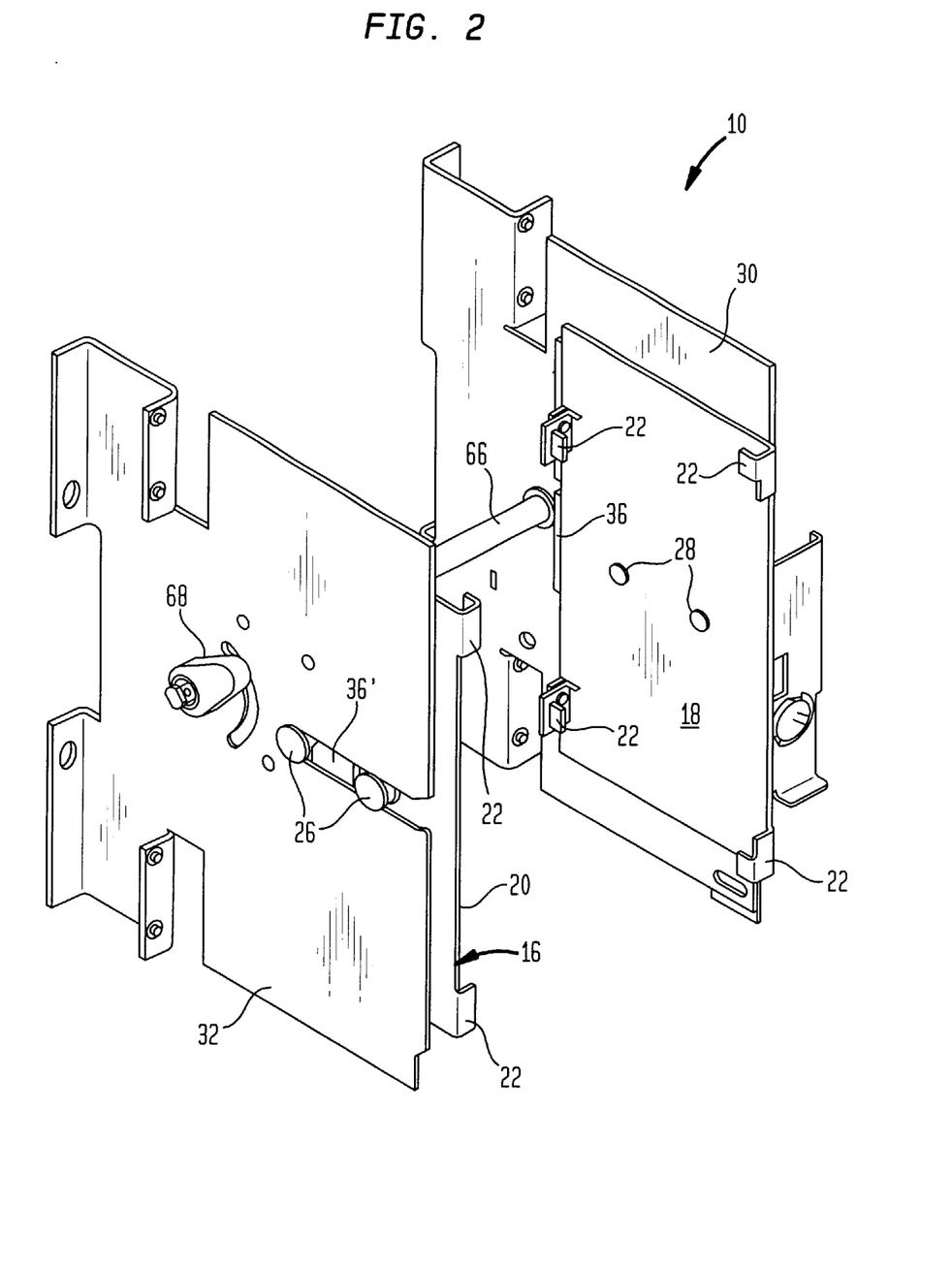
FIG. 2 is a left side perspective view of a draw bracket assembly and cooperating guide assembly of the circuit breaker movement system of FIG. 1.

As best shown in FIG. 2 wherein the circuit breaker 12 and plug-in base 14 are not shown for clarity of illustration, the movement system 10 includes a guide assembly, generally indicated at 16. The guide assembly 16 comprises a pair of guide brackets 18 and 20 constructed and arranged to be mounted adjacent to opposing sides of the circuit breaker 12. In the illustrated embodiment, the guide brackets 18 and 20 include protrusions or hook members 22 which engage an associated slot 24 in the circuit breaker 12 (FIG. 1). In addition, or alternatively, fasteners may be used to join the guide brackets to the circuit breaker.

Each guide bracket 18 and 20 includes a pair of guides 26 which are attached to the associated guide bracket by rivets 28 or the like. The guides 26 may be attached in such a manner to enable rotation of the guides 26 with respect to the associated guide bracket 18 or 20 to define rollers. The guides 26 are used to guide and support the circuit breaker 12 when being drawn into or withdrawn from the plug-in base 14, as will be explained more fully below.

The circuit breaker 12 includes copper stabs 25 extending therefrom to be received by copper jaws in the plug-in base 14 so as to electrically connect and mechanically mount the circuit breaker to the plug-in base. The stabs and jaws are conventional and may be of the type disclosed in U.S. Pat. No. 5,837,949 or U.S. Pat. No. 4,914,549, the content of which is hereby incorporated into the present specification by reference.

Figure 3:
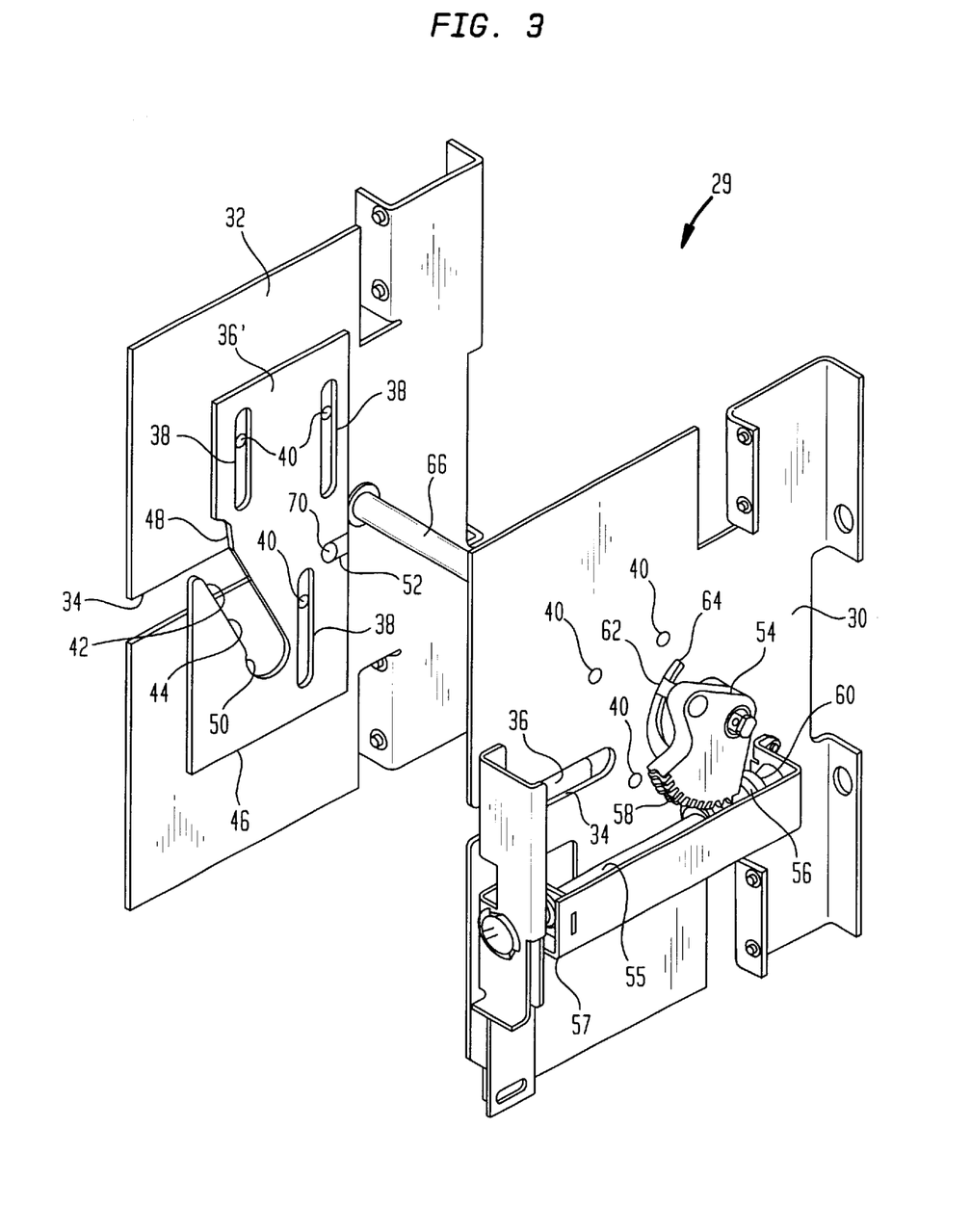
FIG. 3 is a right side perspective view of the draw bracket assembly of FIG. 2.

The movement system 10 also includes components attached to the plug-in base 14. With reference to FIGS. 1–3, the movement system 10 includes a draw bracket assembly, generally indicated at 29, comprising a pair of draw brackets 30 and 32. Each draw bracket 30 and 32 is coupled to an associated side of the plug-in base 14 by fasteners 33 and/or hook-slot arrangements. Each draw bracket 30 and 32 includes a guide receiving slot 34 for receiving the guides 26 therein when installing or withdrawing the circuit breaker 12 from the plug-in unit 14. The draw brackets 30 and 32 provide support for the circuit breaker 12 together with circuit breaker guide brackets 18 and 20.

As best shown in FIGS. 2 and 3, each draw bracket 30 and 32 includes a guide engaging member in the form of a cam plate 36 and 36', respectively. Each cam plate 36 and 36' is identically configured and is mounted for generally vertical movement with respect to its associated draw bracket. As shown in FIG. 3, three elongated slots 38 are provided in each cam plate 36 and 36' and a pin or rivet 40 is coupled to an associated draw bracket 30, 32. Each pin or rivet 40 extends through an associated slot 38 to permit vertical movement of the cam plate 36, 36' with respect to the associated draw bracket. Each cam plate 36, 36' also includes slot structure 42 which opens towards a front of the cam plate. An operable portion 44 of the slot structure 42 is a linear portion disposed at an angle with respect to the base 46 of the cam plate 36, 36'. Idle portions 48 and 50 are provided at each end of the operable portion 44 and extend generally vertically with respect to the base 46, the function of which will be explained below. Each cam plate 36, 36' includes a generally horizontal slot 52 used to couple the cam plate to a motion transmitting structure as will be explained below.

With reference to FIGS. 1 and 3, in a first embodiment of the invention, vertical motion of the cam plate 36 is achieved by a rotating a drive member 55. The head 57 of the drive member 55 can be engaged by a tool to cause rotation of the drive member 55. The drive member 55 carries a movable member in the form of a worm 56 such that rotation of the drive member 55 causes rotation of the worm 56. The motion transferring structure 54 is operatively coupled between the worm 56 and cam plate 36 such that rotation of the worm 56 causes vertical motion of the associated cam plate 36. As shown, the motion transmitting structure 54 includes a worm gear having gear teeth 58 in a sector thereof which engage with gear teeth 60 of the worm 56 during the operational range of travel of the cam plate 36. The operational range of travel of the cam plate 36 defines movement of the circuit breaker 12 between a fully engaged position with respect to the plug-in base 14 and a fully disengaged position with respect to the plug-in base 14. The worm gear of the motion transmitting structure 54 is mounted for rotation with respect to the draw bracket 30 via connection 65. The motion transmitting structure 54 has an eccentric roller 62 which engages the slot 52 in the cam plate 36. In addition, each draw bracket 30 and 32 includes an arcuate slot 64 therein through which roller 62 passes. Thus, rotation of the worm gear of the motion transmitting structure 54 causes the roller 62 engaged in slot 52 of the cam plate 36 to move the cam plate 36 generally vertically with respect to draw bracket 30.

To cause movement of the cam plate 36' associated with draw bracket 32, a shaft 66 is coupled to the motion transmitting structure 54 at one end thereof. The other end of the shaft 66 is coupled to a motion transmitting member 68 associated with draw bracket 32 such that rotation of the motion transmitting structure 54 is simultaneously transmitted to the motion transmitting member 68 via the shaft 66. The motion transmitting member 68 includes an eccentric roller 70 (FIG. 3) which engages an associated horizontal slot 52 in the cam plate 36' so that rotation of the motion transmitting member 68 causes vertical movement of the cam plate 36'. Thus, this structure permits generally simultaneous movement of the cam plates 36 and 36'.

Figure 4A:
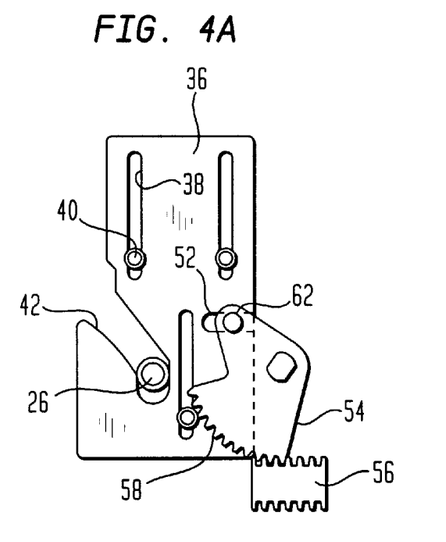
FIG. 4a is a side view of a cam plate of the draw bracket assembly moved by a worm/worm gear arrangement, shown in an up position under load.

To operate the system 10, first, the circuit breaker 12 is aligned with the draw bracket assembly 29. Next, the circuit breaker 12 is guided into slots 34 of the draw brackets 30 and 32 until the guides 26 are resting at their free position in the draw bracket slots 30 and 32. The drive member 55 is then rotated clockwise by engaging the head 57 thereof with a tool to insert or draw the circuit breaker 12 into the plug-in base 14. Clockwise rotation of the drive member 55 rotates the worm 56 which in turn rotates the worm gear of the motion transmitting structure 54 clockwise and this motion is imparted via the shaft 66 to the motion transmitting member 68. The eccentric roller 62 of the motion transmitting structure 54 and of the motion transmitting member 68, engaged with a slot 52 of an associated cam plate, travels in the associated arcuate slot 64 causing upward vertical motion of the associated cam plate (FIG. 4a). This vertical motion captures the two forward guides 26 in the two slot structures 42 of the cam plates 36 and 36' and thereby draws or pulls-in the circuit breaker 12 into the plug-in base 14 so as to cause the copper stabs 25 of the circuit breaker 12 to be inserted or drawn into the copper jaws of the plug-in base 14 (FIG. 1).

Figure 4B:
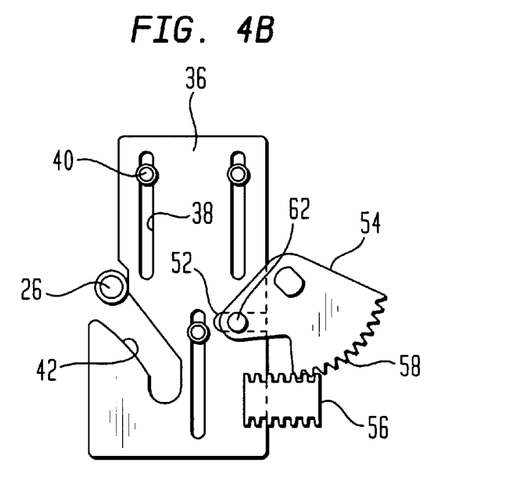
FIG. 4b is a side view of a cam plate of the draw bracket assembly moved by a worm/worm gear arrangement, shown in a down position under load.

To remove, draw-out or otherwise withdraw the circuit breaker 12 from the plug-in base 14, the head 57 of the drive member 55 is rotated counter-clockwise causing the worm 56 to rotate the worm gear of the motion transmitting structure 54 counter-clockwise which in turn causes the cam plates 36 and 36' to move downwardly (FIG. 4b). This action permits the guides 26 to move out of the slot structure 42 and into the slots 34 in the draw brackets 30 and 32, thereby drawing-out and disconnecting the circuit breaker 12 from the plug-in base 14.

Figure 4C:
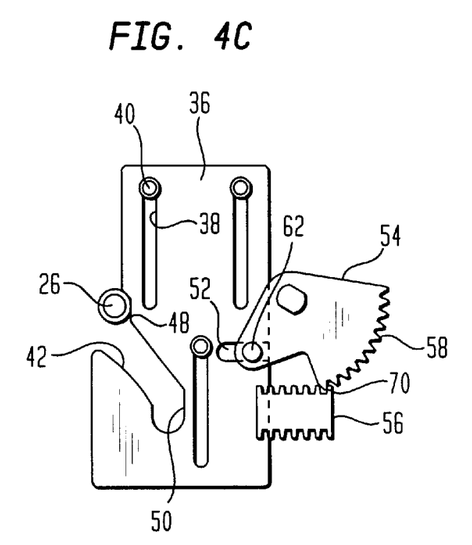
FIG. 4c is a side view of a cam plate of the draw bracket assembly moved by a worm/worm gear arrangement, shown in a downward extended position.
Figure 4D:
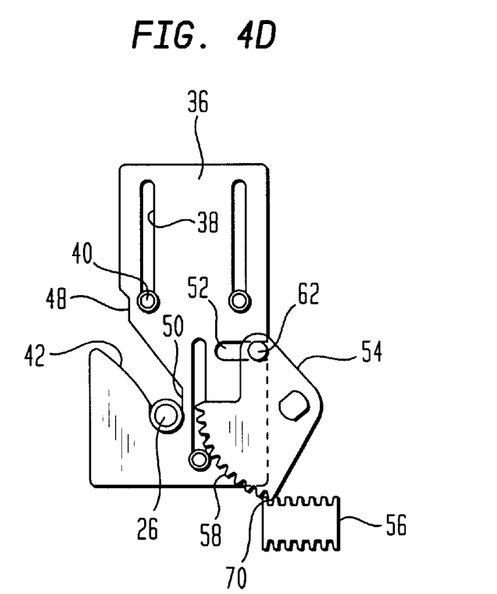
FIG. 4d is a side view of a cam plate of the draw bracket assembly moved by a worm/worm gear arrangement, shown in an upward extended position.

The operational range of the worm/worm gear arrangement is limited by employing a sector of the worm gear of the motion transmitting structure 54. Thus, with reference to FIGS. 4c and 4d, the worm gear teeth 58 disengage from the worm 56 just outside either end of the operational range of motion of the cam plates 36 and 36'. For example, after the circuit breaker stabs 25 are fully engaged with the jaws of the plug-in base 14, the last tooth 70 (FIG. 4d) of the worm gear of the motion transmitting structure 54 disengages from the worm 56 and additional rotation of the of the worm 56 via the drive member 55 causes no motion of the worm gear. As is apparent from FIG. 4c, the worm gear disengages from the worm 56 at the other end of travel. Furthermore, due to the idle portions 48 and 50 of the slot structures 42 in the cam plates 36 and 36', additional movement of the cam plates does not cause additional movement of the circuit breaker 12 at the ends of travel of the cam plates (FIGS. 4c and 4d). The teeth 58 of worm gear sector disengage from the worm 56 after motion of the circuit breaker 12 has ceased, avoiding complex tolerance stack-up conditions.

Figure 5:
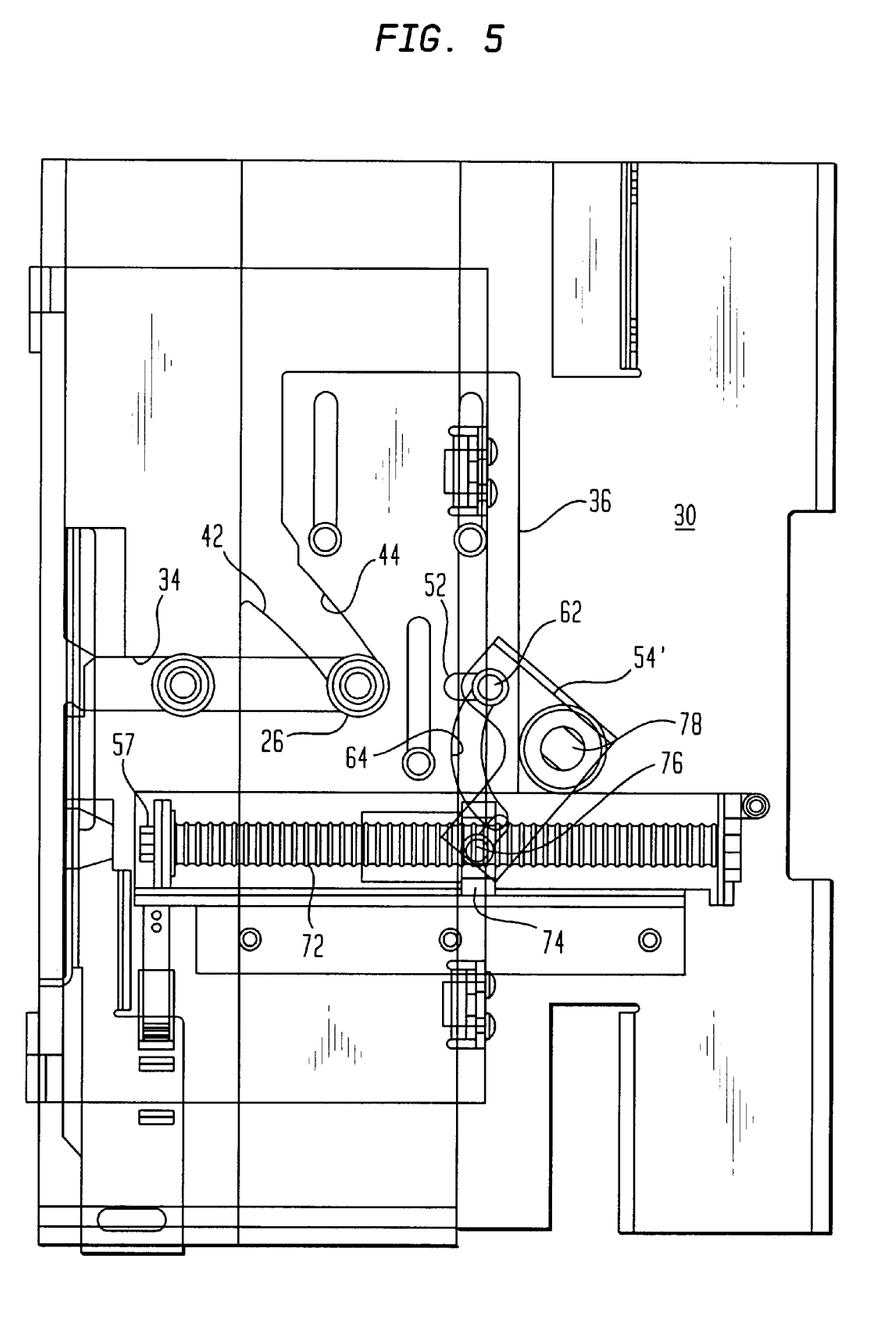
FIG. 5 is a side view of a second embodiment of a draw bracket assembly having a ball screw to move the cam plate.

A second embodiment of the drive mechanism for operating the system 10 of the invention will be described with reference to FIG. 5. The drive member is a ball screw 72 and the movable element is a nut 74 cooperable with the ball screw 72 in the conventional manner. A motion transmitting structure 54' is coupled to the nut 74 via pin 76. The motion transmitting structure 54' is mounted for rotation with respect to draw bracket 30 at pivot 78. The motion transmitting structure 54' includes an eccentric roller 62 engaged in a slot 52 in the clam plate 36. The remaining structure of the system is the same as described above with regard to the first embodiment of the invention. When the head 57 of the ball screw 72 is engaged by a tool and rotated, the nut 74 rotates the motion transmitting structure 54' thereby moving the cam plate 36 vertically between its operational range of motion. The nut 74 is constructed and arranged to disengage from the ball screw 72 outside of the operation range of motion and to reengage the ball screw 72 when the ball screw 72 is rotated in a reverse direction. Thus, when the nut 74 is disengaged or in a free-wheeling state, motion of the ball screw 72 is not transferred to the nut 74 and to the motion transmitting structure 54' thereby preventing an over-travel condition. The ball screw and nut is a conventional assembly and is preferably Part Nos. 59527-9, 19290 and 89838, manufactured by Roton Products, Inc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A mechanism for moving a circuit breaker with respect to a circuit breaker connecting apparatus so as to connect or disconnect the circuit breaker from the circuit breaker connecting apparatus, the mechanism comprising:
   a draw bracket assembly including a draw bracket constructed and arranged to be mounted to the circuit breaker connecting apparatus so as to be generally adjacent to a side of the circuit breaker connecting apparatus,
   a guide engaging member mounted for generally vertical movement with respect to said draw bracket, said guide engaging member having a slot structure therein having surfaces constructed and arranged to receive and engage a guide associated with the circuit breaker for moving the circuit breaker with respect to the circuit breaker connecting apparatus,
   a drive member having a movable element, said drive member being constructed and arranged to be actuated so as to cause movement of said movable element, and
   a motion transmitting structure operatively associated with said movable member and said guide engaging member such that movement of said movable element causes said motion transmitting structure to move thereby causing said guide engaging member to move between an operational range of motion to engage or disengage the circuit breaker from the circuit breaker connecting apparatus, wherein said movable element is constructed and arranged to disengage from said drive member or disengage from said motion transmitting structure outside of said operational range of motion.

2. The mechanism according to claim 1, wherein said guide engaging member is a cam plate, and said slot structure has a first open end, an operable portion and a second end, said slot structure having idle portions at each of said first and second ends such that when the guide of the circuit breaker is at the first or second ends, additional movement of said cam plate does not cause additional movement of the guide and thus the circuit breaker.

3. The mechanism according to claim 2, wherein said motion transmitting structure moves said guide engaging member generally vertically, said open end of said slot structure opens towards the front of said cam plate and said operable portion of said slot structure is a linear portion disposed at an angle with respect to a base of said cam plate, said idle portions being generally vertically extending portions with respect to said base.

4. The mechanism according to claim 1, wherein said guide engaging member includes an elongated slot therein, a pin or rivet is coupled to said draw bracket and extends through said slot to permit generally vertical movement of said guide engaging member.

5. The mechanism according to claim 1, wherein said drive member has a head constructed and arranged to be rotated by a tool.

6. The mechanism according to claim 1, wherein said movable element is a worm having gear teeth, and said motion transmitting structure includes a worm gear having gear teeth on only a sector thereof such that as said drive member is rotated, the gear teeth of said worm engage the gear teeth of said worm gear thereby moving the guide engaging member between said operational range of motion, and the gear teeth of the worm gear disengage the gear teeth of the worm outside of said operational range of motion.

7. The mechanism according to claim 6, wherein said motion transmitting structure is mounted for rotation with respect to one side of said draw bracket and said motion transmitting structure includes an eccentric roller engaged with a horizontal slot in said guide engaging member, said guide engaging member being adjacent a side of said draw bracket opposite said one side, said draw bracket having an arcuate slot therein with said roller extending from said motion transmitting structure through said slot and to said horizontal slot, such that rotation of said worm gear causes rotation of said motion transmitting structure and said roller engaged with said horizontal slot travels in said arcaute slot causing generally vertical movement of said guide engaging member.

8. The mechanism according to claim 1, wherein said drive member is a ball screw constructed and arranged to be rotated by a tool, and said movable element is a ball nut associated with said ball screw, said motion transmitting structure being coupled to a said ball nut, whereby as said ball screw is rotated, said ball nut moves said motion transmitting structure thereby moving said guide engaging member between said operational range of motion, and said ball nut disengages from said ball screw outside of said operational range of motion.

9. The mechanism according to claim 8, wherein said motion transmitting structure is mounted for rotation with respect to one side of said draw bracket and said motion transmitting structure includes an eccentric roller engaged with a horizontal slot in said guide engaging member, said guide engaging member being adjacent a side of said draw bracket opposite said one side, said draw bracket having an arcuate slot therein with said roller extending from said motion transmitting structure through said slot and to said horizontal slot, such that rotation of said motion transmitting structure and said causes said roller, engaged with said horizontal slot, to travel in said arcuate slot thereby causing generally vertical movement of said guide engaging member.

10. The mechanism according to claim 1, wherein said draw bracket assembly includes a second bracket spaced from and connected to said draw bracket via a shaft, one end of said shaft being coupled to said motion transmitting structure, said second bracket having a second guide engaging member mounted for vertical movement with respect thereto so as to engage and disengage a second guide associated with the circuit breaker, said second guide engaging member being movable via a motion transmitting member which is coupled to a second end of said shaft such that movement of said motion transmitting structure causes said shaft and thus said motion transmitting member to rotate which causes said second guide engaging member to move together with said guide engaging member.

11. A system for moving a circuit breaker with respect to a circuit breaker connecting apparatus so as to connect or disconnect the circuit breaker from the circuit breaker connecting apparatus, the system comprising:
   a circuit breaker,
   a guide assembly mounted to said circuit breaker, said guide assembly having a guide disposed so as to extend outwardly with respect to one side of the circuit breaker,
   a circuit breaker connecting apparatus,
   a draw bracket assembly including a draw bracket mounted to the circuit breaker connecting apparatus so as to be generally adjacent to one side of the circuit breaker connecting apparatus,
   a guide engaging member mounted for generally vertical movement with respect to said draw bracket, said guide engaging member having a slot structure therein having surfaces constructed and arranged to receive and engage said guide of the circuit breaker for moving the circuit breaker with respect to the circuit breaker connecting apparatus,
   a drive member having a movable element, said drive member being constructed and arranged to be actuated so as to cause movement of said movable element, and
   a motion transmitting structure operatively associated with said movable member and said guide engaging member such that movement of said movable element causes said motion transmitting structure to move thereby causing said guide engaging member to move between an operational range of motion to engage or disengage the circuit breaker from the circuit breaker connecting apparatus by use of said guide,
   wherein said movable element is constructed and arranged to disengage from said drive member or disengage said motion transmitting structure outside of said operational range of motion.

12. The system according to claim 11, wherein said guide engaging member is a cam plate, and said slot structure has a first open end, an operable portion, and a second end, said slot structure having idle portions at each of said first and second ends such that when said guide is at the first or second end ends, additional movement of said cam plate does not cause additional movement of the guide and thus the circuit breaker.

13. The system according to claim 12, wherein said motion transmitting structure moves said guide engaging member generally vertically, said open end of said slot structure opens towards a front of said cam plate and said operable portion of said slot structure is a linear portion disposed at an angle with respect to a base of said cam plate, said idle portions being generally vertically extending portions with respect to said base.

14. The system according to claim 11, wherein said guide engaging member includes an elongated slot therein, a pin or rivet is coupled to said draw bracket and extends through said slot to permit generally vertical movement of said guide engaging member.

15. The system according to claim 11, wherein said drive member has a head constructed and arranged to be rotated by a tool.

16. The system according to claim 11, wherein said movable element is a worm having gear teeth, and said motion transmitting structure includes a worm gear having gear teeth on only a sector thereof such that as said drive member is rotated, the gear teeth of said worm engage the gear teeth of said worm gear thereby moving the guide engaging member between said operational range of motion, and the gear teeth of the worm gear disengage the gear teeth of the worm outside of said operational range of motion.

17. The system according to claim 16, wherein said motion transmitting structure is mounted for rotation with respect to one side of said draw bracket and said motion transmitting structure includes an eccentric roller engaged with a horizontal slot in said guide engaging member, said guide engaging member being adjacent a side of said draw bracket opposite said one side, said draw bracket having an arcuate slot therein with said roller extending from said motion transmitting structure through said slot and to said horizontal slot, such that rotation of said worm gear causes rotation of said motion transmitting structure and said roller engaged with said horizontal slot travels in said arcaute slot causing generally vertical movement of said guide engaging member.

18. The system according to claim 11, wherein said drive member is a ball screw constructed and arranged to be rotated by a tool, and said movable element is a ball nut associated with said ball screw, said motion transmitting structure being coupled to a said ball nut, whereby as said ball screw is rotated, the ball nut moves said motion transmitting structure thereby moving said guide engaging member between said operational range of motion, and said ball nut disengages from said ball screw outside of said operational range of motion.

19. The system according to claim 18, wherein said motion transmitting structure is mounted for rotation with respect to one side of said draw bracket and said motion transmitting structure includes an eccentric roller engaged with a horizontal slot in said guide engaging member, said guide engaging member being adjacent a side of said draw bracket opposite said one side, said draw bracket having an arcuate slot therein with said roller extending from said motion transmitting structure through said slot and to said, horizontal slot, such that rotation of said motion transmitting structure and said causes said roller, engaged with said horizontal slot, to travel in said arcuate slot thereby causing generally vertical movement of said guide engaging member.

20. The system according to claim 11, wherein said draw bracket assembly includes a second bracket spaced from and connected to said draw bracket via a shaft, said second bracket being coupled to a side of said circuit breaker connecting apparatus opposite said one side thereof, one end of said shaft being coupled to said motion transmitting structure, said second bracket having a second guide engaging member mounted for vertical movement with respect thereto so as to engage and disengage a second guide of said guide assembly which extends outwardly from a side of the circuit breaker opposite said one side thereof, said second guide engaging member being movable via a motion transmitting member which is coupled to a second end of said shaft such that movement of said motion transmitting structure causes said shaft and thus said motion transmitting member to rotate which causes said second guide engaging member to move together with said guide engaging member so as to move said guides and thus the circuit breaker.

21. A method of preventing over-travel of a circuit breaker movement structure, the movement structure including a circuit breaker assembly having a guide, a circuit breaker connecting apparatus having a draw bracket with a guide engaging member being mounted for generally vertical movement with respect to the draw bracket, the guide engaging member having a slot structure therein, a drive member having a movable element, the drive member being constructed and arranged to be actuated so as to cause movement of the movable element, and a motion transmitting structure operatively associated with the movable member and the guide engaging member, the method including:

actuating said drive member to move said movable element causing said motion transmitting structure to move thereby causing said guide engaging member to move between an operational range of motion to engage or disengage the circuit breaker from the circuit breaker connecting apparatus by use of said guide, and causing said movable element to disengage from said drive member or from said motion transmitting structure outside of said operational range of motion.

22. The method according to claim 21, wherein said motion transmitting structure moves said guide engaging member generally vertically.

23. The method according to claim 21, wherein said movable element is a worm having gear teeth, and said motion transmitting structure is a worm gear having gear teeth on only a sector thereof such that as said drive member is rotated, the gear teeth of said worm engage the gear teeth of said worm gear thereby moving the guide engaging member between said operational range of motion, and the gear teeth of the worm gear disengage the gear teeth of the worm outside of said operational range of motion.

24. The method according to claim 21, wherein said drive member is a ball screw constructed and arranged to be rotated by a tool, and said movable element is a ball nut associated with said ball screw, said motion transmitting structure being coupled to a said ball nut, whereby as said ball screw is rotated, the ball nut moves said motion transmitting structure thereby moving said guide engaging member between said operational range of motion, and said ball nut disengages from said ball screw outside of said operational range of motion.

* * * * *